(12) United States Patent
Coronado

(10) Patent No.: US 12,010,983 B2
(45) Date of Patent: Jun. 18, 2024

(54) UNDERGROUND FUMIGATION METHOD

(71) Applicant: Ezequiel Coronado, Glendale, AZ (US)

(72) Inventor: Ezequiel Coronado, Glendale, AZ (US)

( * ) Notice: Subject to any disclaimer, the term of this patent is extended or adjusted under 35 U.S.C. 154(b) by 70 days.

(21) Appl. No.: 17/979,045

(22) Filed: Nov. 2, 2022

(65) Prior Publication Data

US 2024/0138397 A1 May 2, 2024

(51) Int. Cl.
*A01M 13/00* (2006.01)

(52) U.S. Cl.
CPC .................... *A01M 13/00* (2013.01)

(58) Field of Classification Search
CPC ........ A01M 1/24; A01M 1/245; A01M 13/00; A01M 13/006
See application file for complete search history.

(56) References Cited

U.S. PATENT DOCUMENTS 7,451,568 B2 * 11/2008 Hoshall ................. A01M 1/026
43/132.1

* cited by examiner

*Primary Examiner* — Brady W Frazier
*Assistant Examiner* — Shanna Danielle Glover
(74) *Attorney, Agent, or Firm* — Bruce A. Lev

(57) ABSTRACT

An improved underground fumigation method and system including a plurality of elongated pipes placed underground adjacent to a building structure, each having a series of apertures therethrough adapted to allow fumigation liquids and gases to pass along a length thereof and outwardly through the apertures. Each elongated pipe includes an external blockage preventing half-pipe attached along a substantial portion of the length of the elongated pipe and includes a series of apertures therethrough adapted to align with the apertures of the elongated pipe. A main control box is included and attached to each elongated pipe and controls the flow of fumigation liquids and gases therethrough. Furthermore, a fumigation liquid and/or gas supply tank is provided and connected to the main control box and adapted to provide fumigation liquids and/or gas to the underground fumigation system.

9 Claims, 4 Drawing Sheets

UNDERGROUND FUMIGATION METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to property and housing fumigation methods and systems, and more specifically to underground fumigation methods and systems for new construction and existing structures.

2. Description of the Related Art

Prior art fumigation methods and systems for structures are usually installed within the walls, floorings, or foundations of the structures. Some are attached to exterior walls or surfaces thereof. However, these prior art fumigation methods and systems do not prevent pests from reaching the structure. As such, many pests burrow into the ground surrounding the structure and eventually make their way into the structure when existing fumigation chemicals dissipate or are washed away by rain. Accordingly, the present invention overcomes the disadvantages associated with the prior art, by providing an improved underground fumigation method and system including a plurality of elongated pipes placed underground adjacent to the building structure to thereby prevent pests from reaching the structure or burrowing close by the structure. As such, the improved underground fumigation method and system is much more effective at reducing and stopping infestations of pests in or near a structure desired to be protected.

BRIEF SUMMARY OF THE INVENTION

In view of the foregoing disadvantages inherent in the known types of fumigation methods and systems or the like in the prior art, the present invention provides an improved underground fumigation method and system including a plurality of elongated pipes placed underground adjacent to a building structure. As such, the general purpose of the present invention, which will be described subsequently in greater detail, is to provide an improved underground fumigation method and system including a plurality of elongated pipes placed underground adjacent to a building structure, each having a series of apertures therethrough adapted to allow fumigation liquids and gases to pass along a length thereof and outwardly through the apertures. Each elongated pipe includes an external blockage preventing half-pipe attached along a substantial portion of the length of the elongated pipe and includes a series of apertures therethrough adapted to align with the apertures of the elongated pipe. A main control box is included and attached to each elongated pipe and controls the flow of fumigation liquids and gases therethrough. Furthermore, a fumigation liquids and/or gas supply tank is provided and connected to the main control box and adapted to provide fumigation liquids and/or gas to the underground fumigation system.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
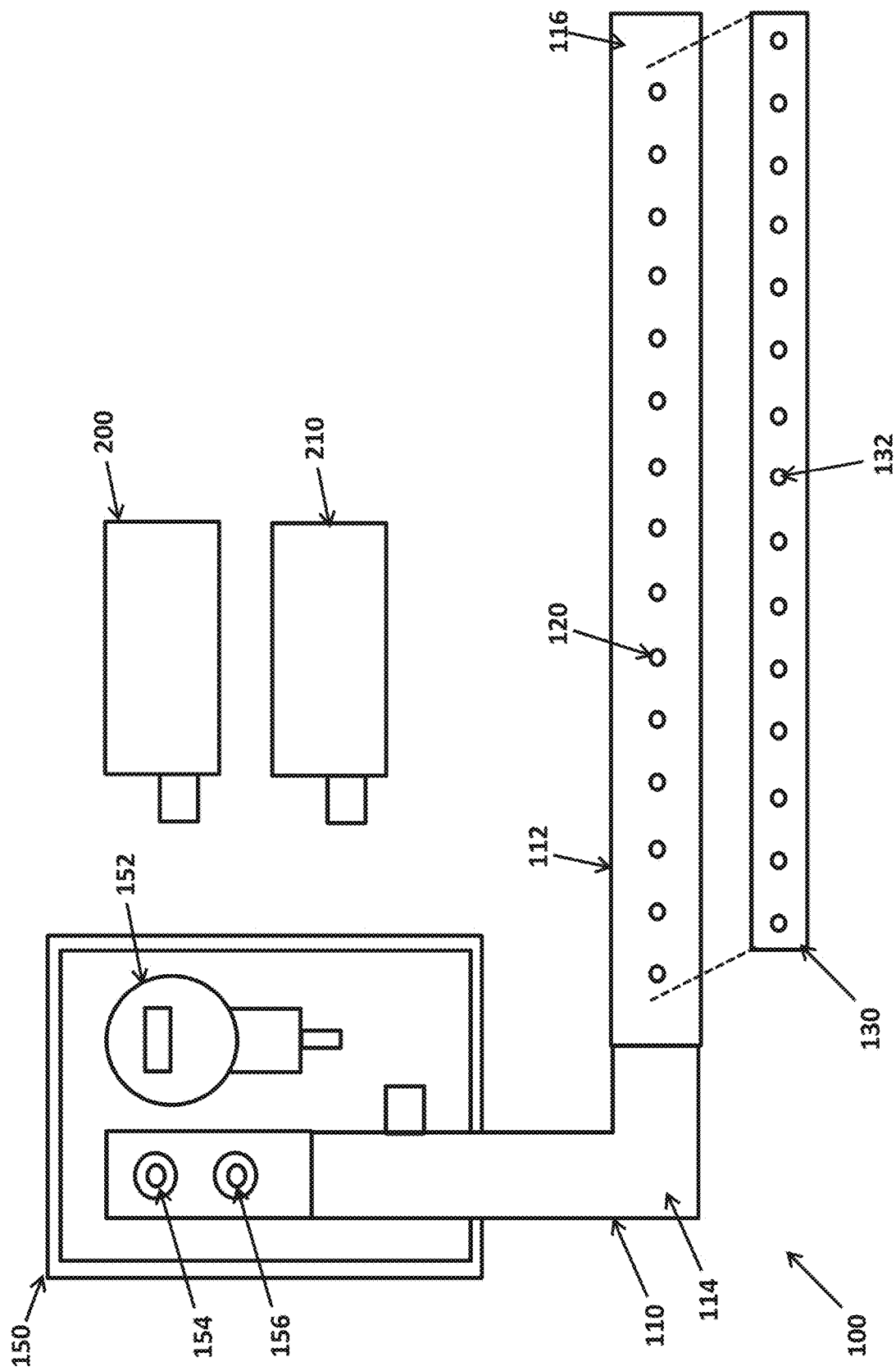
FIG. 1 shows a front exploded view of the improved underground fumigation system according to the preferred embodiment of the present invention.
Figure 2:
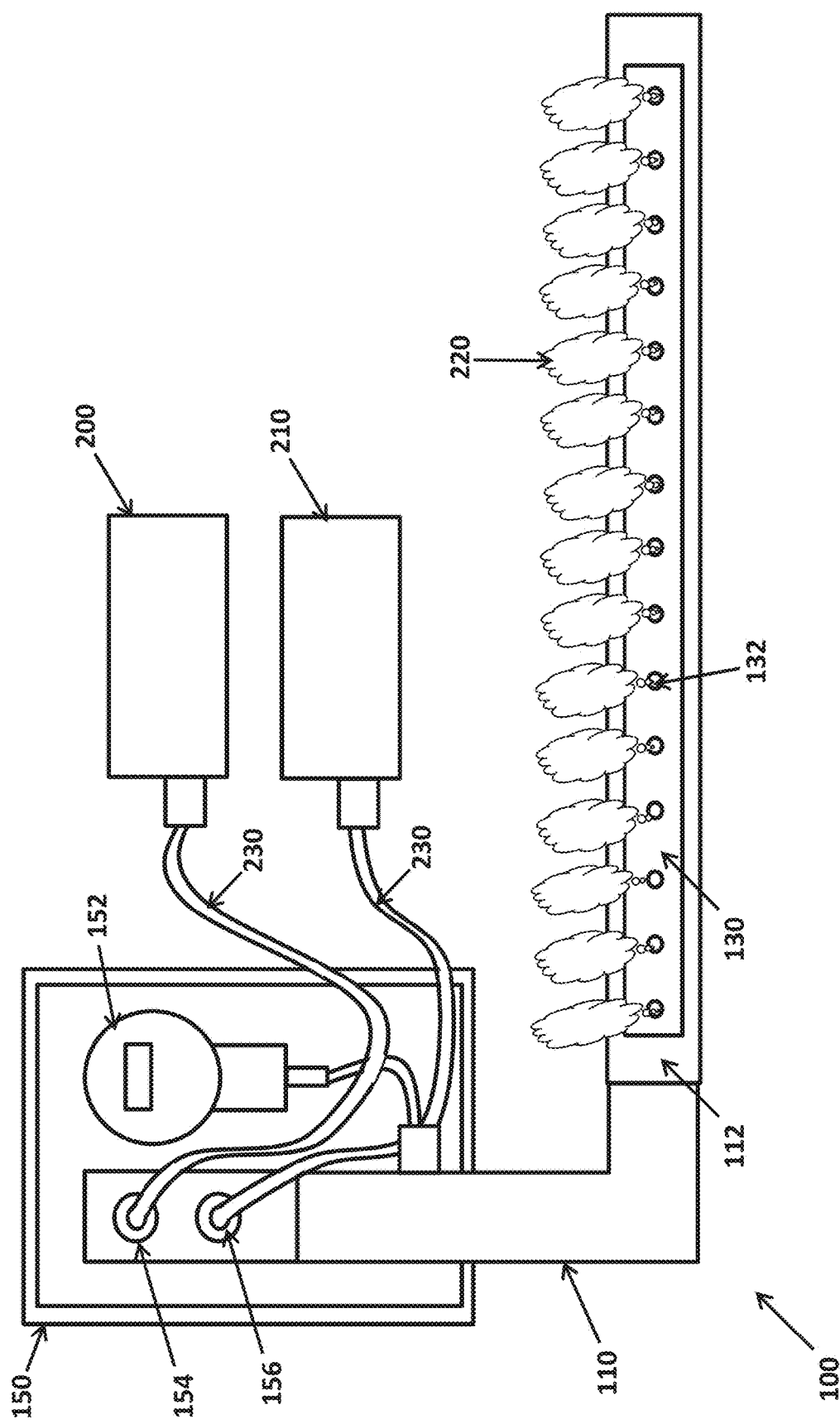
FIG. 2 shows a front view of the improved underground fumigation system according to the preferred embodiment of the present invention of FIG. 1.
Figure 3:
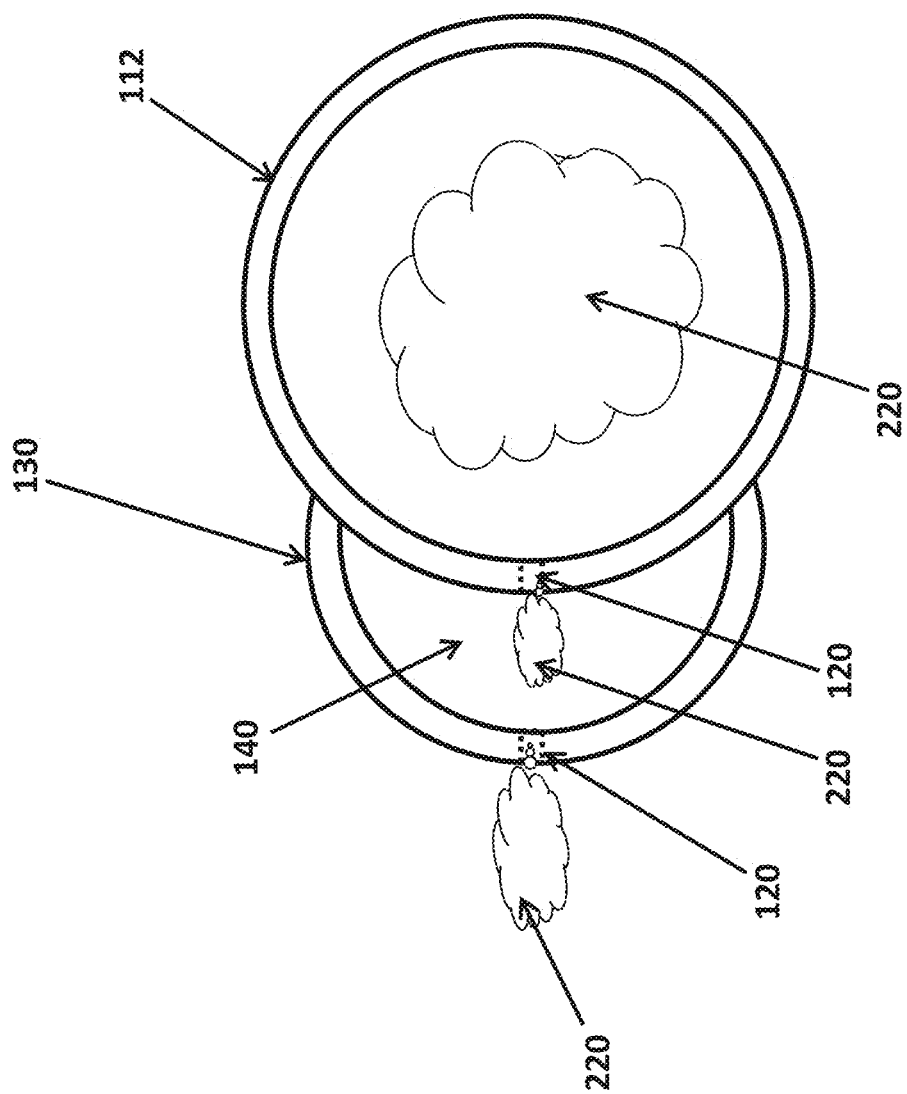
FIG. 3 shows a cross-section of one of the elongated pipes and connected half-pipe according to the preferred embodiment of the present invention of FIG. 1.

Turning now descriptively to drawing, referring to FIGS. 1-4, the present invention discloses an improved underground fumigation system 100 comprising a plurality of elongated pipes 110, each including an elongated tubular body 112 including a proximal end 114, and a distal end 116, a series of apertures 120 spaced from one another along a substantial length of the elongated tubular body and are adapted to allow fumigation liquids and gases to pass therethrough; a half-pipe 130 including a series of apertures 132 spaced from one another along a substantial length of the half-pipe and are adapted to align with the series of apertures 120 of the elongated pipe, as shown in FIGS. 1 and 2, wherein the half-pipe 130 is attached to the elongated tubular body 112 along a substantial length thereof and creates an interior volume 140 therebetween, as shown in FIG. 3; and wherein the half-pipe is adapted to prevent blockages within the elongated tubular body; at least one control box 150 respectively connected to the plurality of elongated pipes and adapted to control the flow of fumigation liquids and gases therethrough; and at least one supply tank 200 connected to each of said at least one control box; and wherein the at least one supply tank 200 is adapted to provide fumigation liquids and gases 220 to the at least one control box and thereby to the plurality of elongated pipes 110; and an air tank 210 adapted to adapted to provide compressed air to the at least one control box and thereby to the plurality of elongated pipes 110; wherein the plurality of elongated pipes are adapted to be placed underground adjacent to a building structure and discharge fumigation liquids and gases there around.

The at least one control box may include a flow and pressure regulator 152, and a coupling for chemicals 154 and a coupling for air 156.

Figure 4:
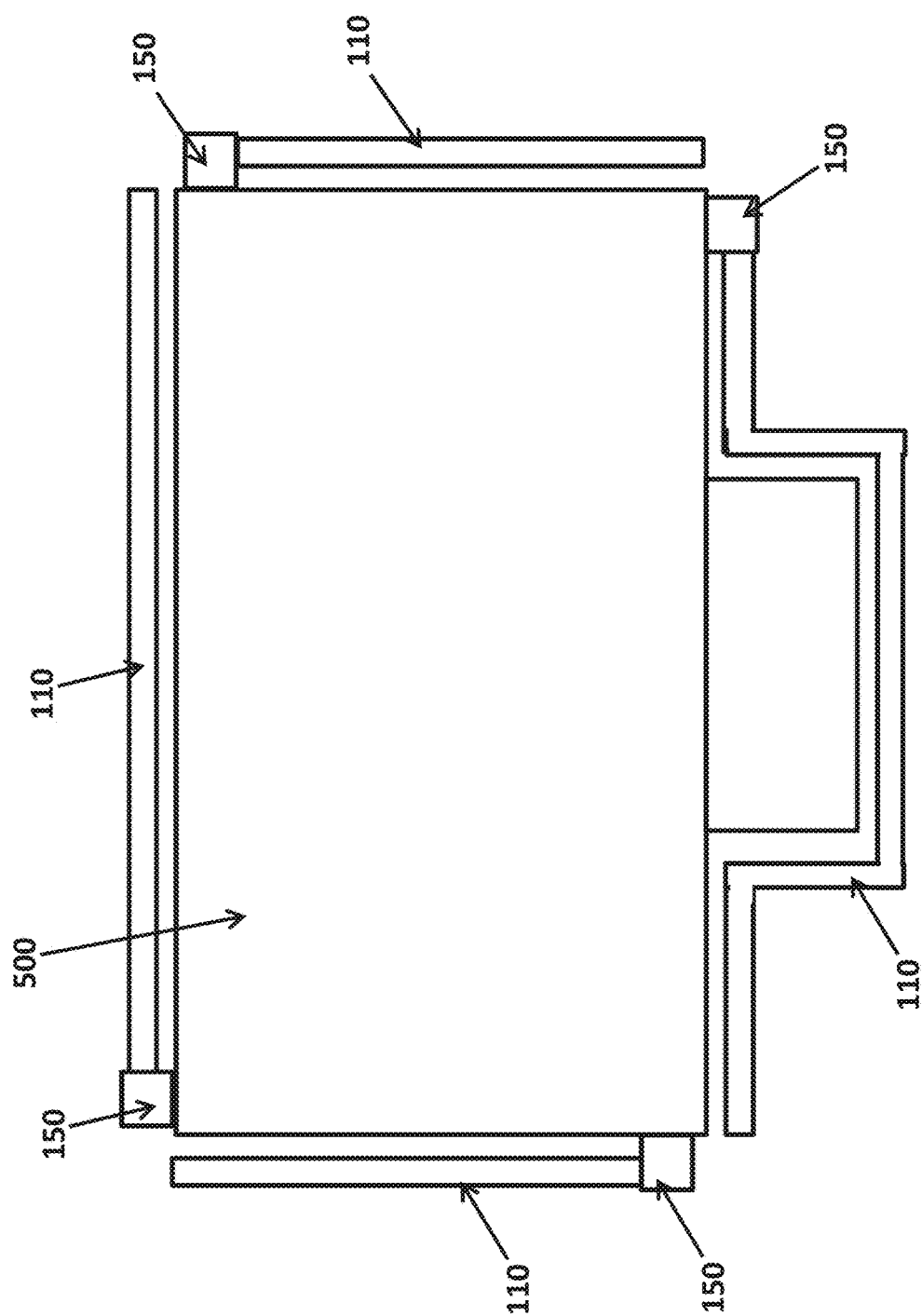
FIG. 4 shows a perspective view of the improved underground fumigation system placed around a building structure according to the preferred embodiment of the present invention of FIG. 1.

The plurality of elongated pipes 110 are made from a material adapted to bent, as shown in FIG. 4, such that the plurality of elongated pipes can be bent around and accommodate curved portions, columns, and detached areas of the building structure 500. As such, the plurality of elongated pipes 110 may be made from copper, aluminum, plastics, and ceramics. The length of the plurality of elongated pipes 110 are formed between 10 and 12 feet.

The method of fumigating an area surrounding a building structure 500 includes the steps of providing the improved underground fumigation system 100 as described above and then embedding the plurality of elongated pipes 110 into a ground surface surrounding the building structure; attaching at least one control box 150 to the building structure; connecting the plurality of elongated pipes to respective said at least one control box; connecting the at least one supply tank 200 to each of the at least one control box 150 using tubes 230; using the control box 150 to extract the fumigation liquids and gases from the supply tank 200 and supplying the fumigation liquids and gases to and through the plurality of elongated pipes 110.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A method of fumigating an area surrounding a building structure comprising the steps of:
providing an underground fumigation system comprising:
a plurality of elongated pipes, each including:
an elongated tubular body including:
a proximal end, and
a distal end,
a series of apertures,
wherein said series of apertures are spaced from one another along a substantial length of said elongated tubular body and are adapted to allow fumigation liquids and gases to pass therethrough; and
a half-pipe including:
a series of apertures,
wherein said series of apertures are spaced from one another along a substantial length of said half-pipe and are adapted to align with said series of apertures of said elongated pipe;
wherein said half-pipe is attached to said elongated tubular body along a substantial length thereof and creates an interior volume therebetween; and
wherein said half-pipe is adapted to prevent blockages within said elongated tubular body;
wherein said plurality of elongated pipes are adapted to be placed underground adjacent to a building structure and discharge fumigation liquids and gases there around;
at least one control box,
wherein said at least one control box is respectively connected to said plurality of elongated pipes and adapted to control the flow of fumigation liquids and gases therethrough; and
at least one supply tank,
wherein said at least one supply tank is connected to each of said at least one control box, and
wherein said at least one supply tank is adapted to provide fumigation liquids and gases to said at least one control box and thereby to said plurality of elongated pipes;
embedding said plurality of elongated pipes into a ground surface surrounding said building structure;
attaching said at least one control box to said building structure;
connecting said plurality of elongated pipes to respective said at least one control box;
connecting said at least one supply tank to each of said at least one control box; and
using said control box to extract said fumigation liquids and gases from said supply tank and supply said fumigation liquids and gases to and through said plurality of elongated pipes.

2. The method of claim 1, wherein said at least one control box includes a flow regulator.

3. The method of claim 1, wherein said at least one control box includes a pressure regulator.

4. The method of claim 1, wherein said at least one control box includes a coupling for air and a coupling for chemicals.

5. The method of claim 1, wherein said plurality of elongated pipes are made from a material adapted to be bent, such that said plurality of elongated pipes can be bent around and accommodate curved portions, columns, and detached areas of said building structure.

6. The method of claim 1, wherein said plurality of elongated pipes are made from a material chosen from a list of materials consisting of copper, aluminum, plastic, and ceramic.

7. The method of claim 1, wherein each of said plurality of elongated pipes are formed having a length between 10 and 12 feet.

8. The method of claim 1, wherein said plurality of elongated pipes are embedded approximately six inches below said ground surface.

9. The method of claim 1, wherein a control box is incorporated every fifty feet of elongated piping.

* * * * *